United States Patent [19]
Nozaki

[11] 3,835,123
[45] Sept. 10, 1974

[54] PROCESS FOR PREPARING INTERPOLYMERS OF CARBON MONOXIDE AND ETHYLENICALLY UNSATURATED COMPOUNDS

[75] Inventor: Kenzie Nozaki, St. Louis, Mo.

[73] Assignee: Shell Oil Company, Houston, Tex.

[22] Filed: Mar. 26, 1973

[21] Appl. No.: 344,679

[52] U.S. Cl.... 260/94.9 B, 260/63 CQ, 260/94.9 R, 260/DIG. 43
[51] Int. Cl............................ C08f 1/64, C08f 13/04
[58] Field of Search...... 260/63 CQ, 94.9 R, 94.9 B, 260/DIG. 43

[56] References Cited
UNITED STATES PATENTS

| | | | |
|---|---|---|---|
| 2,441,082 | 5/1948 | Pinkney | 260/67 |
| 2,495,282 | 1/1950 | Pinkney | 260/67 |
| 2,495,286 | 1/1950 | Brubaker | 260/63 |
| 3,530,109 | 9/1970 | Fenton | 260/94.9 |
| 3,689,460 | 9/1972 | Nozaki | 260/63 |
| 3,694,412 | 9/1972 | Nozaki | 260/63 |

Primary Examiner—Lester L. Lee
Attorney, Agent, or Firm—Norris E. Faringer

[57] ABSTRACT

High molecular weight, crystalline interpolymers of carbon monoxide with one or more unsaturated compounds such as aliphatic monoolefins are prepared by reacting carbon monoxide with said unsaturated compounds in the presence of catalyst consisting essentially of $HPd(CN)_3$. Novel high molecular weight, crystalline interpolymers of carbon monoxide and unsaturated monoolefins, particularly ethylene, having alternating

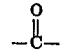

and $—C_2H_4—$ units, are described.

7 Claims, No Drawings

PROCESS FOR PREPARING INTERPOLYMERS OF CARBON MONOXIDE AND ETHYLENICALLY UNSATURATED COMPOUNDS

BACKGROUND OF THE INVENTION

Interpolymers of carbon monoxide and olefins, such as ethylene, as well as processes for their preparation, are known.

Such interpolymers have been prepared, for example, by heating an olefin such as ethylene in an atmosphere of carbon monoxide in the presence of a suitable catalyst including peroxy compounds such as benzoyl peroxide (Brubaker — U.S. Pat. No. 2,495,286) and alkyl phosphine complexes of palladium salts such as tributyl phosphine complexes (ICI — British Pat. No. 1,081,304).

Ethylene-carbon monoxide copolymers have also been prepared by radiation - initiated copolymerizing. See, for example, "$Co^{60}$ $\gamma$-Radiation - Induced Copolymerization of Ethylene and Carbon Monoxide," P. Columbo et al., Journal of Polymer Science: Part A-1, Vol. 4, Pages 29–57 (1966).

In general, the use of peroxy catalysts requires high pressures, i.e., above 500 atmospheres and, on occasion, up to 3,000 atmospheres in order to prepare solid polymers. Thus, normally solid ethylene/carbon monoxide copolymers must be prepared at pressures from about 500 atmospheres (7,500 psi) to 1,000 atmospheres (15,000 psi). Also, it is generally necessary, in order to prepare solid polymers, to employ peroxy catalysts which are free of any Friedel-Crafts catalysts thus severely limiting their use. Furthermore, the use of peroxy catalysts results in low molecular weight polymers having a random distribution of enchained comonomers.

The use of alkyl phosphine complexes of palladium salts requires high temperatures, i.e., greater than 120°C and relatively high pressures, i.e., greater than 2,000 psi. It is also known that these alkyl phosphine complex catalysts, even at such elevated temperatures and pressures, still have relatively low reactivity, i.e., low yields of polymers. The use of alkyl phosphine complexes produces polymers having a random distribution.

Cyano-containing compounds of palladium and their preparation, are generally known. See, for example, the preparation of $H_2Pd(CN)_4$ by reacting $K_2Pd(CN)_4$ with concentrated HCl [D. F. Evans et al., *J.C.S.*, 3,167 (1964)]. It is also known that $Pd(CN)_2$ is an effective catalyst for preparing ethylene-carbon monoxide copolymers. See, for example, U.S. Pat. No. 3,530,109.

While the copolymers prepared using $Pd(CN)_2$ have relatively high molecular weight, the yields are low and the resulting copolymers are grey water-insoluble solids. Also, the catalyst residues in the polymer are generally difficult to remove.

It has now been discovered that high molecular weight, linear, crystalline, nearly white interpolymers of carbon monoxide and ethylenically unsaturated monomers, such as ethylene, can be prepared in high yield when a catalyst consisting essentially of $HPd(CN)_3$ is employed.

This novel catalyst, $HPd(CN)_3$, and its preparation is the subject matter of copending Pat. application, Ser. No. 344,680 filed Mar. 26, 1973.

SUMMARY OF THE INVENTION

The present invention provides an improved process for preparing in high yield linear, high molecular weight (>10,000), crystalline, nearly white, water-insoluble, interpolymers of carbon monoxide and a copolymerizable ethylenically unsaturated comonomer, particularly a monoolefin, and more particularly ethylene, having an alternating 1:1 ratio of carbon monoxide and comonomer.

DESCRIPTION OF THE PREFERRED EMBODIMENTS

The present invention will be described in greater detail with reference to the preparation of interpolymers of carbon monoxide and ethylene, although it is understood that one or more other suitable ethylenically unsaturated organic compounds may be employed.

By "ethylenically unsaturated organic compounds" is meant those compounds which contain a

linkage.

Examples of suitable unsaturated compounds coming within the scope of the present invention include the monoolefins, preferably containing from about two to eight carbon atoms such as ethylene, propylene, butylene, isobutylene, and pentylene; diolefins such as butadiene, isoprene, and 2-chlorobutadiene-1,3; vinylidene compounds such as vinylidene chloride; tetrafluoroethylene; vinyl halides, esters and acetals, such as vinyl acetate, vinyl chloride, vinyl chloroacetate, vinyl dimethylacetate, and vinyl trimethylacetate; vinyl ketones such as vinyl methyl ketone and vinyl ethyl ketone; vinyl hydrocarbons such as styrene, chlorostyrene and alphamethyl styrene; acrylic and methacrylic acids, esters, amides, nitriles and acid halides; and vinyl esters of unsaturated carboxylic acids such as vinyl hexenoate, vinyl crotonate, etc. The above listing is not exhaustive and is presented as representative. Other unsaturated compounds will be apparent to one skilled in the art.

Preferred ethylenically unsaturated compounds include the monoolefins, particularly the alpha-olefins, having from two to eight carbon atoms. Particularly preferred is ethylene.

Copolymers prepared by the instant process have the general formula:

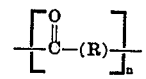

wherein R is the residue of the copolymerizable monomer and $n$ is an integer having a value of from about 200 to 40,000 or expressed in another way, $n$ has a value commensurate with a total molecular weight of roughly $10^4$ to $2 \times 10^6$.

The above alternating structure was confirmed by NMR measurements. The molecular weight of the resulting polymers was estimated from intrinsic viscosity measurements of polymer solutions in meta-cresol and hexafluoroisopropanol (HFIPA).

It will be appreciated that R may represent residues of different monomers in the same interpolymer when two or more comonomers are employed. Thus, if a mixture of ethylene and propylene were employed, a representative idealized structural formula would be:

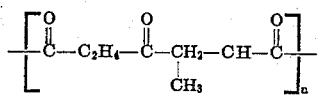

wherein $n$ has an appropriate value as noted above, e.g., to produce a mol weight of $10^4$ to $2 \times 10^6$.

The preferred interpolymer is an interpolymer of carbon monoxide and ethylene having the following formula:

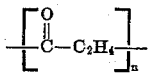

wherein $n$ has the value as noted above, and preferably from about $10^3$ to $10^4$.

The catalyst utilized in the present process consists essentially of $HPd(CN)_3$. This novel catalyst, $HPd(CN)_3$, and its preparation by several methods is described in detail in copending Pat. application, Ser. No. 344,680, filed Mar. 26, 1973.

One method for preparing $HPd(CN)_3$ comprises (1) contacting $Pd(CN)_2$ with an aqueous solution of HCN in molar excess for a time and temperature sufficient to effect the desired reaction, and (2) evaporating the resulting reaction mixture to dryness under reduced pressure (in vacuo) at a temperature of from about 0° to 40°C, and preferably about 20°–30°C, and (3) recovering the white, water-soluble $HPd(CN)_3$ residue.

In general, $Pd(CN)_2$ is treated with an excess aqueous solution of HCN for a few minutes to several days at temperatures ranging from about 0° to 100°C. Preferably, the reaction is performed at temperatures from about 70° to 90°C for periods ranging from about ½ to 5 hours. It will be appreciated that lower temperatures require longer reaction times and higher temperatures allow much shorter reaction times.

As stated hereinbefore, the HCN is utilized in excess and as an aqueous solution. A 100 to 500 percent stoichiometric excess is usually adequate, however, a greater or lesser excess may be employed as desired. In general, the HCN is employed as a 1 to 10 percent aqueous solution. A very suitable reaction procedure comprises reacting $Pd(CN)_2$ with a 200 percent excess of a 5 percent aqueous solution of HCN for 1–3 hours at 70° to 90°C.

After the desired reaction is completed, reaction product is recovered by evaporating the solution to dryness in vacuo. The water and excess HCN is thereby removed by applying reduced pressure, i.e., a vacuum of less than about 10 mm of mercury at temperatures less than about 25°C. The resulting product is a water-soluble white powder analyzed as $HPd(CN)_3$.

Another method for preparing $HPd(CN)_3$ comprises (1) contacting an aqueous solution of $K_2Pd(CN)_4$ with a conventional acid-type cation exchange resin in the acid form, (2) evaporating the resulting solution to dryness in vacuo at a temperature of from about 0° to 40°C and (3) recovering the white, water-soluble $HPd(CN)_3$ residue.

Any cation exchange resin is suitable for use in the instant method so long as it is in the "acid form." Cation exchange resins are well known and are commercially available from a number of manufacturers under a multitude of trade designations. For a more detailed description of the theory, preparation and regeneration of cation exchange resins, see "Ion Exchange," Helfferich, McGraw-Hill Book Company, Inc. (1962), particularly pages 29–47, and "Ion Exchange Resins" Kunin, John Wiley and Sons, Inc., Second Edition (1958), particularly pages 82–97.

As noted hereinbefore, any cation exchange resin can be employed to prepare the instant catalyst; however, excellent results are obtained when the cation exchange resin is a sulfonic acid cation resin, a carboxylic-type cation resin, a sulfonated phenolic cation resin, a carboxylic sulfonic resin as well as the phosphoric, phosphonic and phosphorus acid resins and aluminum silicate resins. All these types are commercially available. For a list of the major commercially available cation exchange resins, see "Ion Exchange Resins," Kunin, John Wiley and Sons, Inc. Second Edition (1958), Table 13. In addition, the patent literature is replete with descriptions of the preparation of suitable cation exchange resins. See, for example, U.S. Pat. Nos. 2,860,109,; 2,877,191; 2,885,371; 2,891,014; 2,898,311; 3,030,317; and 3,275,575, among many others.

An aqueous solution of $K_2Pd(CN)_4$ is simply contacted with a suitable cation exchange resin resin for a period of time which is sufficient to exchange the $K^+$ ion for the $H^+$ ion. In general, a 1 to 25 percent by weight aqueous solution of $K_2Pd(CN)_4$ solution is contacted with the cation exchange resin for 1 to 24 hours at temperatures from about 10° to 100°C for ½ to 10 hours.

The resulting solution is then placed under reduced pressure (in vacuo) and all the water and volatile material removed as hereinbefore described. The resulting product is a water-soluble, white powder analyzed as $HPd(CN)_3$.

Although pure $HPd(CN)_3$ is the preferred catalyst, it may be desirable to utilize a catalyst blend or mixture which contains a major amount of $HPd(CN)_3$. In order to prepare essentially pure $HPd(CN)_3$, it is essential, even critical, to perform the evaporation step under reduced pressure (in vacuo) at a temperature between about 0°C and 40°C. At temperatures above about 40°C, the resulting catalyst product is a mixture of $HPd(CN)_3$ and other Pd compounds, believed to be essentially $Pd(CN)_2$.

It should therefore be appreciated that if the catalyst is prepared at temperatures above about 40°C, i.e., from about 40° to 90°C, the resulting residue is not pure $HPd(CN)_3$ but a blend consisting essentially of $HPd(CN)_3$. It should be further appreciated that this mixture is still a more effective catalyst than $Pd(CN)_2$ alone in that the yield of polymer per gram of catalyst is higher. Also, copolymers of carbon monoxide and ethylene prepared by the instant process utilizing such catalyst blend or mixtures are white to grey, water insoluble copolymers. Furthermore, the catalyst residues in the polymers are more easily removed when such mixtures are employed than when $Pd(CN)_2$ is utilized alone.

The pure, or essentially pure, $HPd(CN)_3$ is the preferred catalyst.

In general, the amount of catalyst will vary from as little as about 0.001 percent to as much as 5 percent by weight based on the total monomers charge. In most instances, for a number of reasons, it is generally preferable to utilize the minimum quantity of catalyst consistent with the desired purity, yield, conversion, etc; however, amounts from about 0.005 to about 1 percent have been found suitable for most applications.

The polymerization of the carbon monoxide with the ethylenically unsaturated compound can be carried out either in a batch, semi-continuous or continuous process wherein the catalyst and the monomers are first charged into a suitable reaction vessel. The mixture is then generally heated either under autogeneous pressure or under superatmospheric pressure until the degree of polymerization is achieved.

The polymerizaion may be performed in vessels constructed or lined with glass, steel, copper, aluminum, silver, stainless steel, etc.; however, stainless steel, or other inert metals are preferred.

In general, the polymerization process is performed at temperatures ranging from about 75° to 150°C and at pressures from slightly above atmosperhic pressure to 1,000 atmospheres.

It is preferred, however, to utilize temperatures of from about 75° to 125°C and pressures from about 10 to 1,000 atmospheres with from 25 to 150 atmospheres pressure being especially preferred.

In order to achieve acceptable catalyst activity and reaction rates, it is not essential that the copolymerization be performed in the presence of a solvent or reaction media; however, under some circumstances, it may be desirable to employ one or more suitable media.

Suitable media include water or any other normally liquid, non-polymerizable, preferably volatile organic compounds including the aromatic and saturated acyclic and alicyclic hydrocarbons, ethers, esters, alcohols, amines, ketones, halogenated hydrocarbons, etc. Suitable such solvents include among others, benzene, toluene, xylene, isooctane, cyclohexane, formamide, pyridine, ethyl acetate, etc.

Especially suitable solvents include the nitrogen-containing solvents, particularly nitriles, such as acetonitrile.

In general, the monomers may be introduced into the reactor in a wide range of ratios. Preferably, however, it is highly desirable to use an excess of comonomers to the carbon monoxide. Thus, a very suitable mole ratio of ethylene to carbon monoxide is from about 1:1 to 50:1 with from about 10:1 to 20:1 being preferred.

The following examples are presented in order to illustrate the process of the present invention. It is understood, however, that the examples are for the purpose of illustration only and that the invention is not to be regarded as limited to any of the specific conditions or reactants recited therein. Unless otherwise indicated, parts described in the examples are parts by weight. Pressure measurements are at ambient (room) temperatures.

EXAMPLE I

This example illustrates the preparation of $HPd(CN)_3$ via the $Pd(CN)_2$-aqueous HCN method.

One gram of $Pd(CN)_2$ and 100 ml of a 4%w aqueous solution of HCN were added to a 200 ml tantalum pressure vessel. The $Pd(CN)_2$ turned white and partially dissolved. The vessel was closed and it was heated with agitation for 4 hours at 90°C. The vessel and contents were cooled to room temperature, the vessel opened and the colorless, clear solution was removed. The solution was evaporated to dryness in a rotating evaporator in vacuo (ca 1 mm Hg) at room temperature (22°C). 1.16g of a white, water-soluble residue was obtained, which was handled in a dry box.

Elemental analysis of the residue was consistent with the formula $HPd(CN)_3$ (Found: 19.0% C, 22.4% N, 0.60% H, 57.0% Pd. Calculated for $HPd(CN)_3$ 19.3% C, 22.6% N, 0.54% H, 57.7% Pd). The recovery of product (1.16g) was very close to the theoretical (1.17g). Aqueous solutions of the compound were highly acidic (pKa = 2.3) and potentiometric titrations showed 0.9 to 1.1 protons per palladium.

EXAMPLE II

This example illustrates the preparation of $HPd(CN)_3$ via the ion-exchange method.

1.2g of $K_2Pd(CN)$ was dissolved in 15 ml of distilled water and 10g of acidic ion exchange resin (Amberlite IR 120H) was added. After stirring for 3 hours, the resin was filtered off and replaced. This was repeated five times. The solution was evaporated to dryness in a rotating evaporator in vacuo at room temperature. A white residue was obtained which weighed 0.77g. It analyzed for 57.3% Pd (theory is 57.7%), and titration with NaOH indicated 1.02 protons per palladium.

EXAMPLE III

This example illustrates the preparation of an ethylene-carbon monoxide copolymer using the instant novel catalyst $HPd(CN)_3$.

Into a 600 ml tantalum reactor was added 0.025g of $HPd(CN)_3$ prepared in Example I, 50 ml of dried cyclohexane, 7g of glass beads, 100 psig of carbon monoxide and 850 psig of ethylene. The reactor and contents were heated and shaken at 105°C for 18 hours. After cooling, depressuring, opening the reactor, and separating the beads and solvent, 13.5g of a white polymer melting at about 260°C and analyzing for 64.2%w C, 7.2%w H and 28.6%w O were obtained.

Under similar conditions, 0.025g of $HPd(CN)_3$ prepared according to Example II yielded 13.4g of polymer and 0.021g of $Pd(CN)_2$ yielded 4.7g of polymer. NMR analyses confirmed that the polymers had an alternating $-C_2H_4-$ and

structure.

EXAMPLE IV

This example illustrates the superiority of $HPd(CN)_3$ over $Pd(CN)_2$ as a catalyst for the copolymerization of ethylene and carbon monoxide.

Into a 600 ml tantalum reactor were placed 7g of glass beads, 50 ml of cyclohexane, 850 psig of ethylene, 100 Psig of carbon monoxide (at 20°C), and various amounts of $Pd(CN)_2$, $HPd(CN)_3$ prepared as in Example I (ex aq HCN), and $HPd(CN)_3$ prepared as in Example II (ex cation exchange resin). The results are as follows:

| Catalyst | Wt. g | Max pressure psig | Time hr. | Temp. °C | Copolymer g |
|---|---|---|---|---|---|
| $Pd(CN)_2$ | 0.021 | 1620 | 18 | 105 | 4.7 |
| $HPd(CN)_3$ (I.E.) | 0.025 | 1500 | 18 | 105 | 13.4 |
| $HPd(CN)_3$ (aq HCN) | 0.025 | 1550 | 18 | 105 | 13.5 |
| $HPd(CN)_3$ (I.E.) | 0.025 | 1700 | 8 | 115 | 10.8 |
| $HPd(CN)_3$ (aq HCN) | 0.025 | 1725 | 8 | 115 | 11.4 |

The above data clearly illustrate that significant higher yields of copolymer are obtained in a given period of time when the catalyst is $HPd(CN)_3$.

EXAMPLE V

This example illustrates the preparation of several $C_2H_4$—CO copolymers utilizing $HPd(CN)_3$ prepared at various HCN concentrations, times, temperatures, etc.

Into a 50 ml stainless steel reactor equipped with a magnetic stirrer were added $Pd(CN)_2$ and various amounts of $HPd(CN)_3$ prepared as hereinbefore described, 850 psig of ethylene and 100 psig of carbon monoxide (at 20°C). The reactor was heated to 95°C with stirring. After 18 hours at 95°C, the polymer residue was recovered. The results of representative experimental runs are tabulated in Table I.

TABLE I

| Catalyst | Cat. g | Polymer g | Color |
|---|---|---|---|
| $Pd(CN)_2$ | 0.0034 | 0.60 | Grey |
| $HPd(CN)_3$-(ex 4% aq HCN 3 days 25°C) | 0.0050 | 1.26 | White |
| $HPd(CN)_3$-(ex 4% aq HCN, 4 hrs., 70°C) | 0.0050 | 1.41 | White |
| $HPd(CN)_3$-(ex 4% aq HCN, 4 hrs., 90°C) | 0.0010 | 0.33 | White |
| $HPd(CN)_3$-(ex cation exchange, 5 treat) | 0.0010 | 0.40 | White |

In all experimental runs, polymers prepared with $Pd(CN)_2$ were grey, whereas polymers prepared with $HPd(CN)_3$ were white.

EXAMPLE VI

This example illustrates the preparation of copolymers of $C_2H_4$ and CO in the presence of $HPd(CN)_3$ utilizing a number of solvents. The $HPd(CN)_3$ was prepared in situ from 0.075 grams of $Pd(CN)_2$ and 1.5 moles of HCN per mole of $Pd(CN)_2$.

The reaction was performed in a 600 ml tantalum reactor containing 0.03g (est) of $HPd(CN)_3$, 7 grams of glass beads, 50 mls of various solvents with 850 psig $C_2H_4$, 150 psig CO. After 18 hours at 105°C, the polymer was recovered. The results are as follows:

| Solvent | Max. Pressure psig | Copolymer g | Intrinsic Viscosity dl/g (m-cresol) |
|---|---|---|---|
| None | 1825 | 17.9 | 5.02 |
| Cyclohexane | 1625 | 17.0 | 5.50 |
| Water | 1750 | 0.4 | — |
| Cyclohexene | 1600 | 4.3 | 4.58 |
| Ethanol | 1760 | 5.0 | 2.57 |
| Acetonitrile | 1750 | 5.3 | 3.63 |
| m-Cresol | 1840 | 13.0 | 4.14 |
| Chloroform | 1550 | 14.0 | 5.36 |
| n-Hexane | 1600 | 15.7 | 4.80 |
| Dimethoxyethane | 1675 | 16.0 | 1.43 |
| Acetic acid | 1700 | 17.1 | 3.83 |
| Methyl ethyl ketone | 1675 | 19.7 | 4.52 |
| Ethyl acetate | 1700 | 20.1 | 5.38 |

EXAMPLE VII

This example illustrates the preparation of other olefin-carbon monoxide copolymers.

Into a 50 ml stainless steel reactor equipped with magnetic stirring were placed various catalysts, olefins and carbon monoxide. The results of representative experimental runs are as follows:

| Catalyst | Olefin | Olefin Press. psig[a] | CO Psig[a] | Time Hr. | Temp. °C | Yield g | I.V. (dl/g in m-Cresol) | M.P.°C |
|---|---|---|---|---|---|---|---|---|
| 0.05g $Pd(CN)_2$ | $C_3H_6$ | 850 | 100 | 94 | 65 | 0.287 | 0.93 | 200–220 |
| 0.05g $HPd(CN)_3$ | $C_3H_6$ | 850 | 100 | 65 | 105 | 0.65 | 0.60 | 190–220 |
| 0.025g $HPd(CN)_3$ | Butene-1 | 850 | 150 | 18 | 115 | 0.03 | — | — |
| 0.025g $HPd(CN)_3$ | Norbornylene | 2g | 150 | 18 | 115 | 0.014 | — | — |

[a]Pressures at room temperature.

I claim as my invention:

1. A process for preparing high molecular weight, linear interpolymers of carbon monoxide with at least one alpha-olefin having from two to eight carbon atoms which comprises reacting 1 mole of carbon monoxide with from about 1 to about 50 moles of alpha-olefin at about 75°C to about 150°C and about 10 to about 1,000 atmosphere pressures in the presence of a catalytic amount of a catalyst consisting essentially of $HPd(CN)_3$.

2. A process as in claim 1 wherein the carbon monoxide to alpha olefin is employed in a mole ratio of from about 1:5 to about 1:25.

3. A process as in claim 1 wherein the alpha-olefin is ethylene.

4. A process as in claim 1 wherein the reaction temperature is from about 75° to 125°C.

5. A process as in claim 1 wherein an inert organic medium is employed.

6. A process as in claim 5 wherein the medium is a nitrogen-containing hydrocarbon.

7. A process as in claim 6 wherein the hydrocarbon is acetonitrile.

* * * * *